United States Patent
Song et al.

(10) Patent No.: US 6,369,517 B2
(45) Date of Patent: Apr. 9, 2002

(54) INFRARED INDUCTIVE LIGHT SWITCH USING TRIAC TRIGGER-CONTROL AND EARLY-CHARGING-PEAK CURRENT LIMITER WITH ADJUSTABLE POWER CONSUMPTION

(75) Inventors: Qun Song; Jian Li; Fang Xie, all of ShangHai (CN)

(73) Assignee: Pericom Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 09/681,273

(22) Filed: Mar. 12, 2001

(30) Foreign Application Priority Data

Jun. 27, 2000 (CN) ............................................. 00116805

(51) Int. Cl.[7] ................................................ G05F 1/00
(52) U.S. Cl. .................... 315/194; 315/159; 315/291; 315/224
(58) Field of Search .............................. 315/158, 159, 315/194, 199, 200 R, 208, 224, 291; 323/220, 223, 224; 361/3, 5, 100

(56) References Cited

U.S. PATENT DOCUMENTS

| | | | |
|---|---|---|---|
| 3,633,095 A | * 1/1972 | Hood | 323/319 |
| 3,781,604 A | 12/1973 | Scarpino | 315/312 |
| 3,886,352 A | 5/1975 | Lai | 250/215 |
| 3,896,355 A | 7/1975 | Guicheteau | 318/207 |
| 4,079,267 A | 3/1978 | Ryczek et al. | 307/141 |
| 4,103,294 A | 7/1978 | Stettner et al. | 340/566 |
| 4,344,071 A | 8/1982 | Allen | 340/566 |
| 4,358,729 A | 11/1982 | Hart | 323/322 |
| 4,413,193 A | 11/1983 | Crockett | 307/311 |
| 4,728,866 A | * 3/1988 | Capewell et al. | 315/194 |
| 4,825,330 A | * 4/1989 | Walchle | 361/101 |
| 4,873,469 A | 10/1989 | Young et al. | 315/155 |
| 5,164,651 A | 11/1992 | Hu et al. | 318/778 |
| 5,323,062 A | 6/1994 | Crawford et al. | 307/125 |
| 5,455,491 A | * 10/1995 | Hajagos et al. | 315/158 |
| 5,633,540 A | 5/1997 | Moan | 307/126 |
| 5,716,129 A | 2/1998 | Kunen et al. | 362/394 |
| 5,808,423 A | 9/1998 | Li et al. | 315/313 |
| 5,977,882 A | 11/1999 | Moore | 340/825.72 |

* cited by examiner

Primary Examiner—Haissa Philogene
(74) Attorney, Agent, or Firm—Stuart T. Auvinen

(57) ABSTRACT

An electronic switch can replace a standard mechanical light switch for 110–240 volt alternating-current (A.C.) devices. A triac switches the A.C. current to an A.C. device such as a light. A rectifier bridge generates a direct-current (D.C.) voltage that is applied to a special current limiter. The special current limiter generates a large current peak at low voltages, but limits current at high voltages. The large current peak from the special current limiter charges a capacitor when voltage is low at the beginning of each A.C. half-cycle, before the triac turns on. The capacitor has enough charge to supply D.C. current to an Infrared detector and trigger control logic for the rest of the A.C. half-cycle. When the detector detects a person nearby, it signals the trigger control logic. The D.C. voltage from the rectifier bridge is filtered to generate a sync pulse to the trigger control logic when adds a phase delay to the sync pulse which triggers the triac.

24 Claims, 9 Drawing Sheets

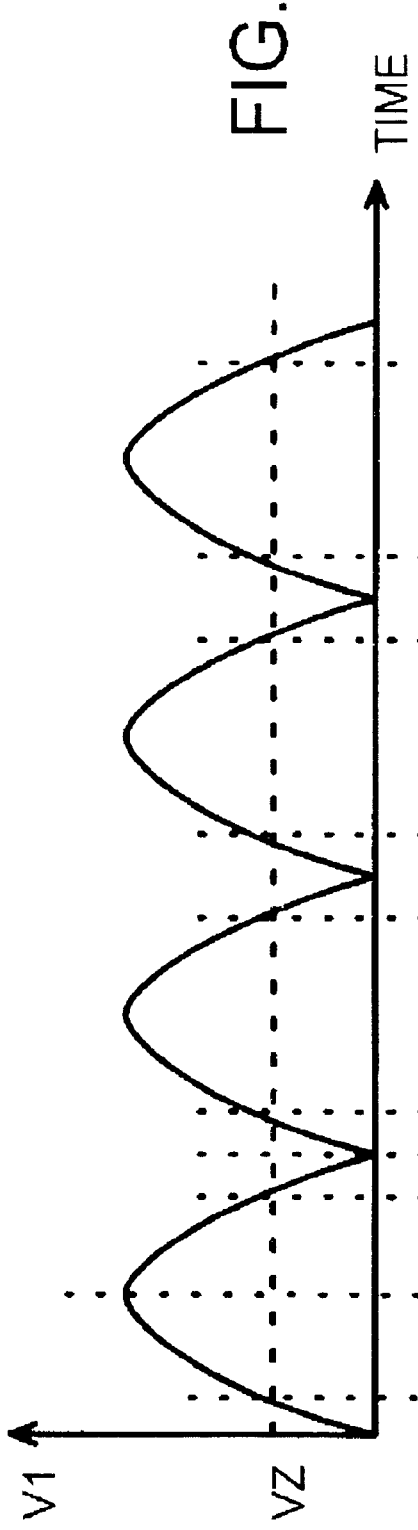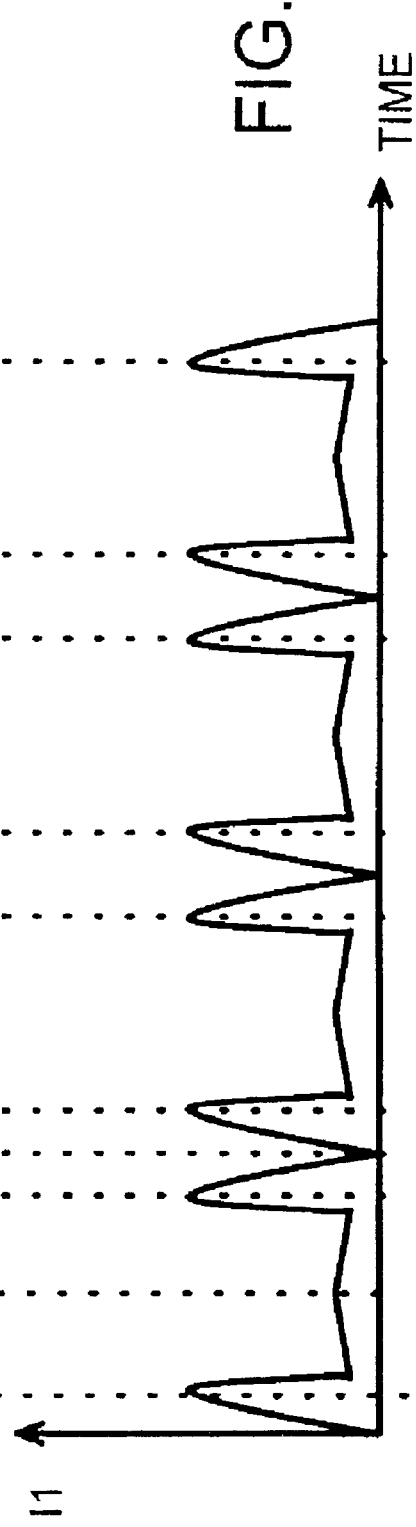

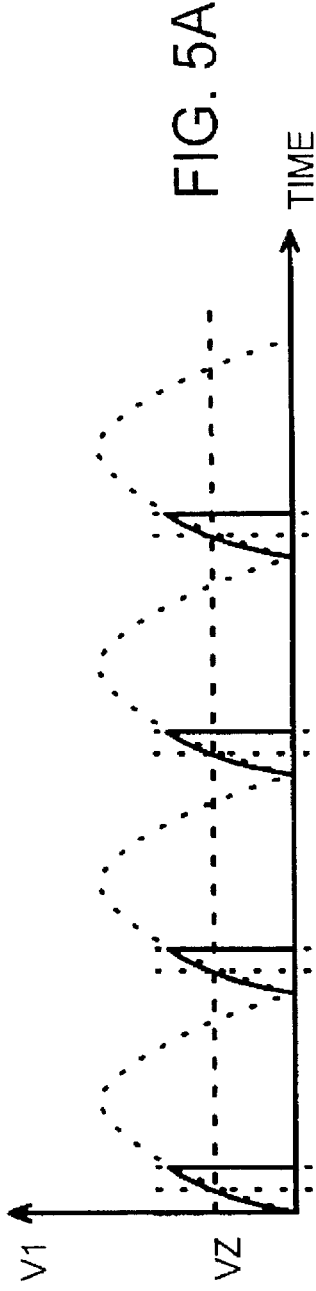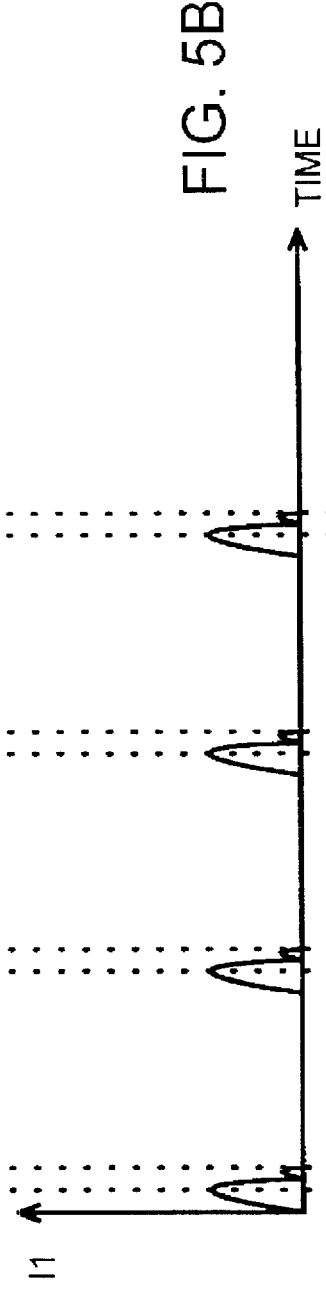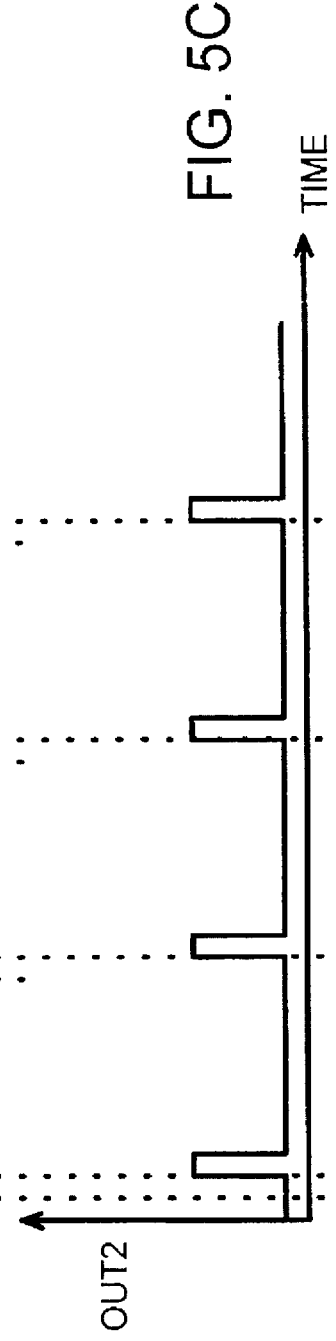

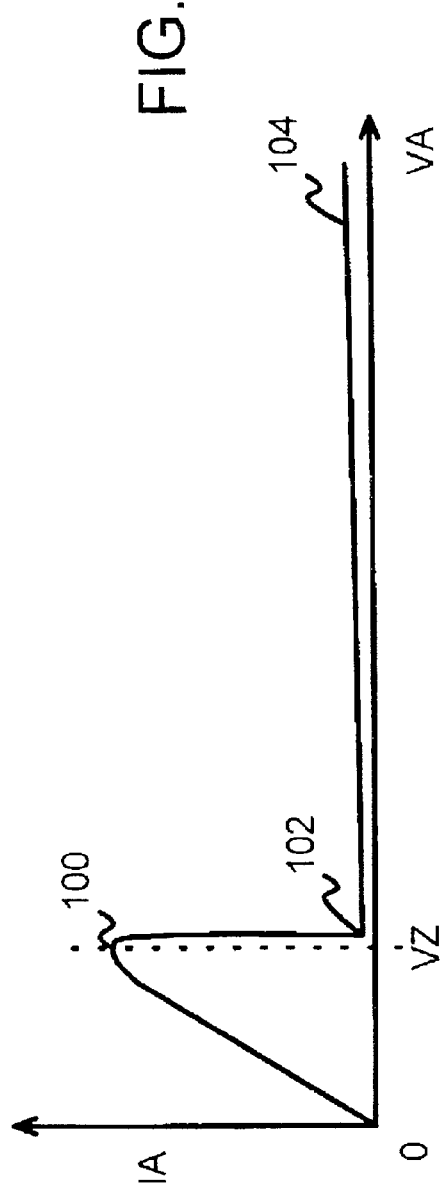
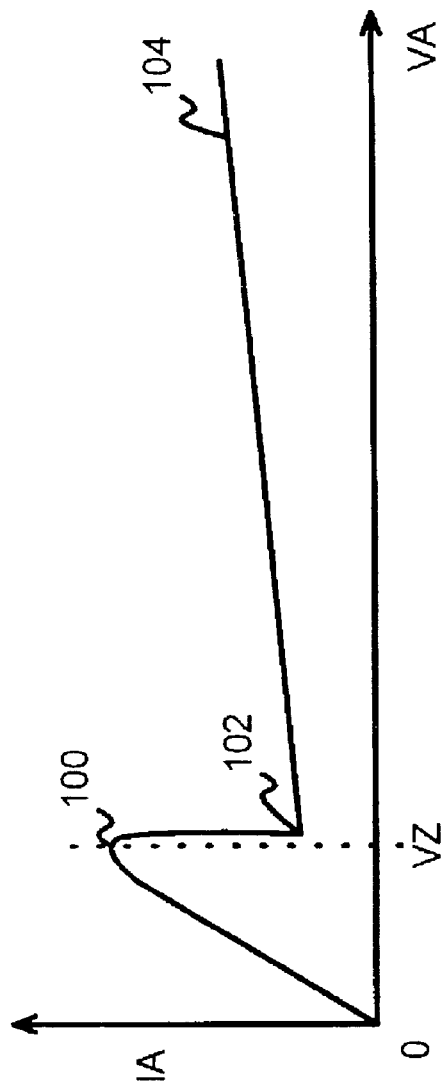

INFRARED INDUCTIVE LIGHT SWITCH USING TRIAC TRIGGER-CONTROL AND EARLY-CHARGING-PEAK CURRENT LIMITER WITH ADJUSTABLE POWER CONSUMPTION

CROSS REFERENCE TO RELATED APPLICATIONS

This application claims priority to foreign application No.: 00116805.3 (China, P.R.) which has a filing Date of Jun. 6, 2000.

BACKGROUND OF INVENTION

This invention relates to electronic switches, and more particularly to inductive light switches.

Mechanical light switches are commonly used in the home and at the office. Such switches are often mounted in the wall near a doorway, allowing a person to flip the switch to turn on the room lights. Such mechanical switches may also control other electrical appliances that are plugged into wall plugs or receptacles that are controlled by the switch.

More recently, more advanced electronic switches have been developed to replace such mechanical switches. The electronic switch may include a motion sensor or infrared sensor to detect when a person is moving in a room. Thus the room lights appear to turn on automatically when a person enters a room. A timer may also be used to turn off the lights after a period of time without motion, such as in an office after 6 PM.

Such electronic switches can be used in a variety of applications, not just for light switches. Switches designed for switching standard 110–240 volt alternating-current (A.C.) lines are desirable due to the widespread use of such standard power lines inside buildings.

BRIEF DESCRIPTION OF DRAWINGS

FIGS. 4A–B are waveforms showing current and voltage characteristics of the special current limiter.

FIGS. 5A–C are waveforms highlighting charging currents when the triac turns on due to detection.

FIGS. 6A–B are I-V curves for the special current limiter when larger and smaller resistance values are used for the high-voltage resistors.

DETAILED DESCRIPTION

The present invention relates to an improvement in electronic switches. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
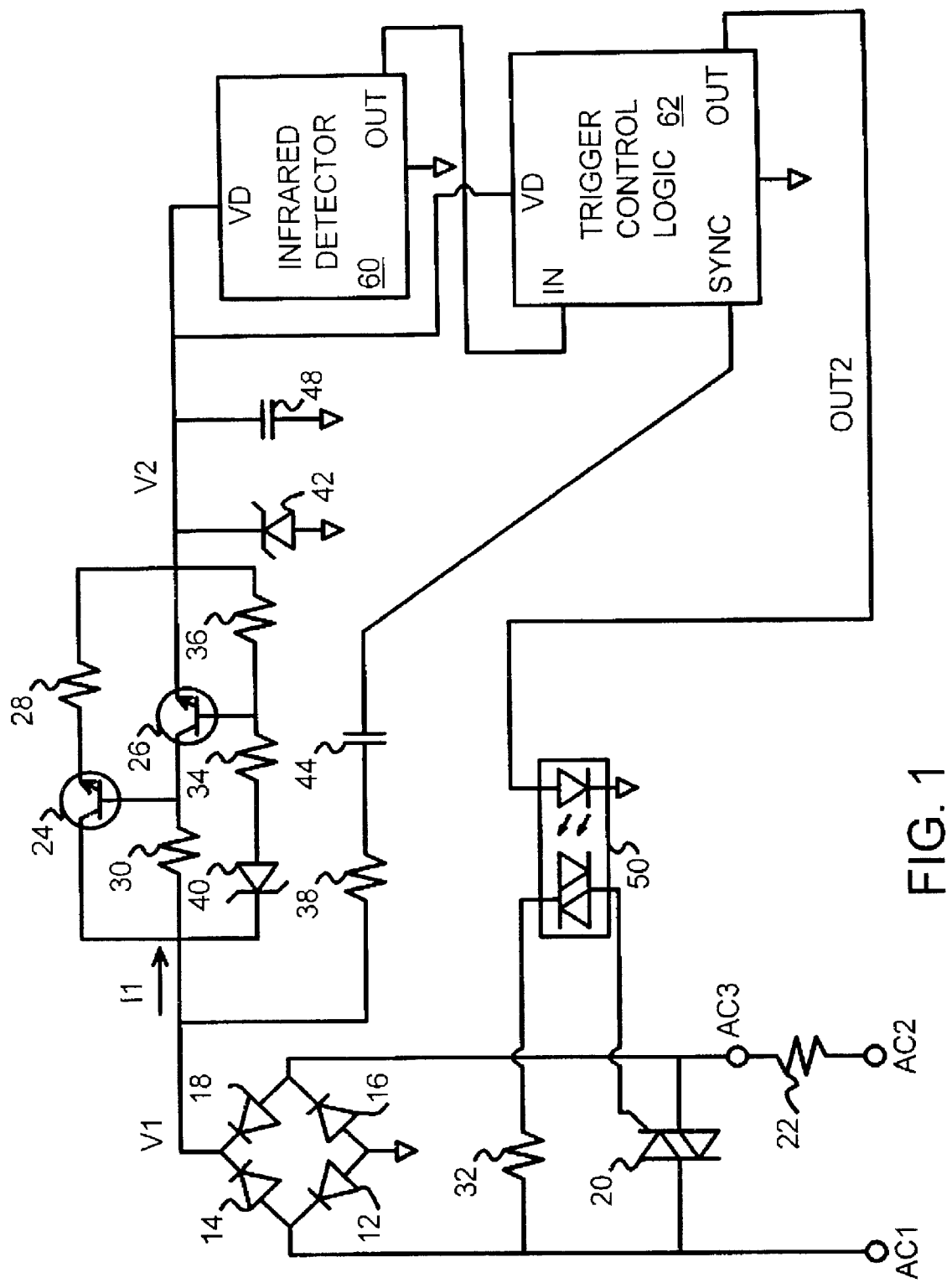
FIG. 1 is a schematic of an optically-isolated A.C. power switch using a current limiter to charge a shunt regulator that powers low-voltage D.C. components.

FIG. 1 is a schematic of an optically-isolated A.C. power switch using a current limiter to charge a shunt regulator that powers low-voltage D.C. components. Standard A.C. power lines of 110–240 volts root-mean-square (rms) are coupled across terminals AC1 and AC2. Load resistor 22 can be a light bulb in a light controlled by the switch, or another electrical device such as a radio, TV, or computer plugged into a power plug or receptacle. The exact amount of load resistance produced by the light or electrical device varies with the device. The switch connects terminals AC1 and AC3 when the switch is closed (activated or on), but disconnects AC1 and AC3 when the switch is open (disconnected or off). Terminals AC1 and AC3 could be connected to the black and white wires on a standard home electrical cable in the U.S. that carry the A.C. current.

The electrical device represented by load resistor 22 is turned on when the switch triggers triac 20, switching on current between terminals AC1 and AC3. Once triggered, triac 20 remains on until the direction of the A.C. current reverses. The voltage difference across A.C. terminals AC1 and AC3 drops to near zero when triac 20 turns on.

A triggering current is generated by opto-electronic coupler 50 when current flowing through the light-emitting diode (LED) input side of the opto-electronic coupler generates light that is captured by the thyristor output side of opto-electronic coupler 50. The generated light activates the thyristor, causing current to flow through. This current flows from terminal AC1 through limiting resistor 32 and the thyristor side of opto-electronic coupler 50 to the trigger terminal of triac 20, turning it on.

Opto-electronic coupler 50 isolates the higher-voltage A.C. signals from the lower-voltage D.C. components in the switch. These D.C. components could be damaged by the unfiltered A.C. signals. However, coupling using light prevents various kinds of electrical coupling into the D.C. components.

The A.C. power signal is converted into D.C. power using a rectifier bridge of diodes 12, 14, 16, 18. When AC1 is a positive voltage and AC3 is a negative voltage, current in the bridge flows from AC1 through diode 14 to node V1, while current from ground flows through diode 16 to AC3. During the other half of the A.C. wave, AC1 is a negative voltage and AC3 is a positive voltage. Then current in the bridge flows from AC3 through diode 18 to node V1, while current from ground flows through diode 12 to AC1. Thus the A.C. current from terminals AC1 and AC3 is converted to a D.C. voltage on node V1 between diodes 14, 18, relative to the D.C. ground between diodes 12, 16.

The voltage on node V1 varies with time, the maximum peak at about the same peak voltage as the A.C. voltage amplitude, 155 to 338 volts. This is still a much higher voltage than the acceptable voltage by many D.C. components such as integrated circuits, many of which operate at 5 volts.

A special current limiter is formed by transistors 24, 26 and resistors 28, 30, 34, 36 and Zener diode 40. This special current limiter provides a high current when the voltage on node V1 is low, but a low current when the voltage on node V1 is high. This allows a high current to flow from node V1 to node V2 during the parts of the A.C. cycle when the instant voltage is low, but little current flows to node V2 during high instant voltage portions of the A.C. cycle.

Shunt capacitor 48 is a charge store that is charged by the high current through the special current limiter during the low-voltage regions of the A.C. cycle, near the crossover (0-voltage) part of the A.C. cycle or sine wave. During the peaks and troughs of the A.C. cycle, when the absolute voltage is large, the special current limiter provides little current to shunt capacitor 48. Instead, shunt capacitor 48 provides charge or current to D.C. components such as detector 60 and trigger control logic 62. Shunt capacitor 48 provides enough charge over the remainder of the A.C. cycle to power these D.C. components. Thus shunt capacitor 48 acts as a D.C. power source, driving the power-supply VD inputs to detector 60 and trigger control logic 62. Shunt capacitor 48 has a sufficiently large capacitance value to power the D.C. components by compensating for charge drawn by the D.C. components from node V2.

Shunt Zener diode 42 acts to regulate the voltage on node V2. When the voltage on node V2 rises above the reverse-breakdown or trigger voltage of the Zener diode, reverse conduction occurs, shunting current to the D.C. ground. Once the voltage on node V2 falls back below the trigger voltage, shunt Zener diode 42 turns off again. Together, shunt capacitor 48 and shunt Zener diode 42 act as a shunt regulator, regulating the internal D.C. power-supply voltage VD on node V2.

Resistor 38 and capacitor 44 form a synchronizing or synchronous-signal-sampling network, sampling the rectified waveform on node V1. A sync signal is generated each time the voltage on node V1 falls back to zero, which occurs twice for each A.C. cycle, at the crossovers. This sync signal is input to the sync input of trigger control logic 62.

When infrared detector 60 senses a person nearby, it activates its detect-signal output OUT, which is the IN input to trigger control logic 62. Trigger control logic 62 then outputs a delayed pulse after the sync pulse is received when the IN input is activated by the detector 60 sensing a person nearby. The pulses output by trigger control logic 62 activate the LED in opto-electronic coupler 50, activating the thyristor side, which generates the trigger current to triac 20, turning on the A.C. switch.

Since the sync pulses are generated by resistor 38 and capacitor 44 for each A.C. half-cycle, opto-electronic coupler 50 is pulsed on at the start of each half-cycle when detector 60 detects a person nearby. Thus pulsing re-triggers triac 20, turning it on again for each of the two half-cycles for each A.C. period.

Special Current Limiter Produces High Current for Low Voltages

Figure 2A:
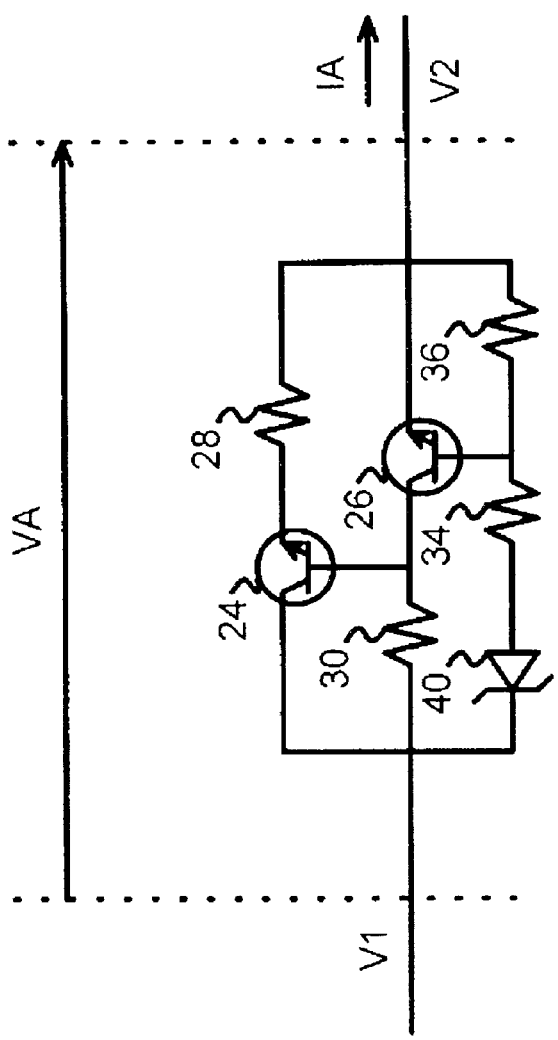
FIG. 2A is a schematic highlighting the special current limiter that limits current for high voltages.

FIG. 2A is a schematic highlighting the special current limiter that limits current for high voltages. There are three primary paths through the special current limiter: a high-current path through transistor 24 and resistor 28, a low-current path through resistor 30 and transistor 26, and a control path through Zener diode 40 and resistors 34, 36. The paths are connected together by activating voltages that control transistors 24, 26. These activating voltages are typically applied to the bases of bipolar transistors, but can also be applied to the gates of MOS transistors.

Zener diode 40 has a breakdown voltage VZ that is usually chosen to be a suitable value. When the rectified voltage V1 is low, VA is below VZ, then Zener diode 40 is off and only leakage current flows. The lack of current flow through Zener diode 40 prevents current flow through resistor 34, causing no base-emitter current to flow through transistor 26. Transistor 26 is off, in the cut-off region of operation with little or no collector-to emitter current flow. Thus most or all of the current through resistor 30 is diverted into the base of transistor 24, causing the base-emitter junction to become forward biased. This turns on transistor 24, allowing a large collector current to flow. Transistor 24 then typically operates in the saturated region. This collector current and the smaller base current flow from the emitter of transistor 24 through resistor 28.

Thus for voltages VA across the special current limiter that are below VZ, current IA through the special current limiter flows mostly through transistor 24 and resistor 28. This current begins to flow at a VA of about 0.6 volt, when the base-emitter junction of transistor 24 is turned on.

Once the voltage VA across the special current limiter exceeds VZ, Zener diode 40 turns on, and current flows from node V1 through Zener diode 40 and resistor 34. Some of this current flows through resistor 36 and the rest of the current flows into the base of transistor 26. Once the voltage across resistor 36 reaches the junction turn-on voltage of about 0.6 volt, the base current into transistor 26 turns it on. The base current through transistor 26 increases until transistor 26 becomes saturated.

Once transistor 26 turns on, the current through resistor 30 is sent through the collector of transistor 26, reducing the current through the base of transistor 24. The voltage drop across resistor 28 reduces the base-emitter voltage of transistor 24 relative to that of transistor 26. Eventually transistor 24 turns off, while transistor 26 remains on. Most of the IA current then flows through resistor 30 and transistor 26, rather than through transistor 24 and resistor 28.

The values of resistors 30, 34 are typically much larger than the resistance of resistor 28. This causes the current flow through transistor 24 to be much larger than the current through transistor 26. Since transistor 24 is on for lower voltages below VZ, while transistor 26 is on for higher voltages above VZ, the total current IA is large for voltages below VZ, but small for high voltages.

Figure 2B:
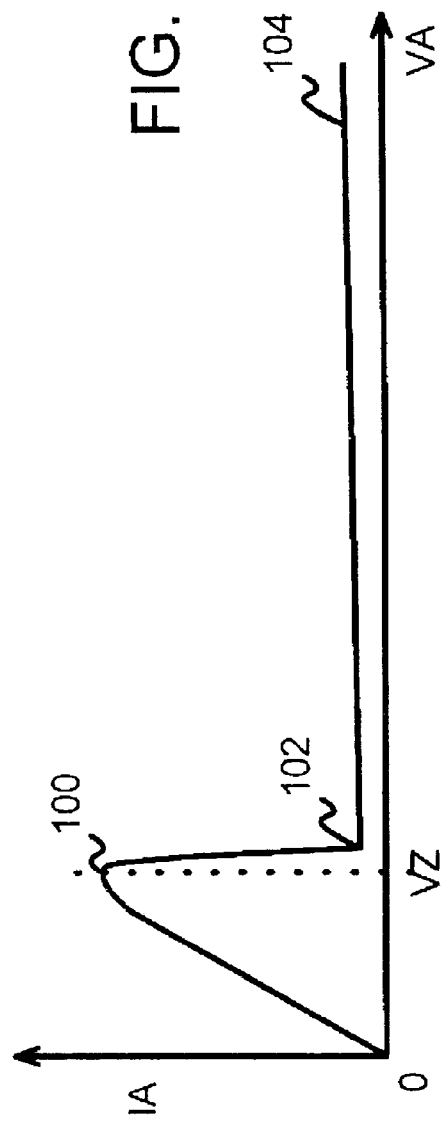
FIG. 2B shows current waveforms for the special current limiter.

FIG. 2B shows current waveforms for the special current limiter. The total current IA through the special current limiter initially rises as the current flows through transistor 24. Since this current is limited by resistor 28, the slope of the curve from about the origin to near point 100 is the resistance of resistor Z8 and rises sharply due to the relatively low resistance of resistor 28.

As the Zener breakdown voltage VZ is reached at point 100, Zener diode 40 turns on, sending current into the base of transistor 26. Transistor 26 turns on, depriving transistor 24 of its base current. Transistor 24 shuts off. Now the current flows mostly through resistors 30, 34, which have relatively large resistances. The relatively larger resistance of resistors 30, 34 compared to resistor 28 causes a lower current to flow through the special current limiter. Thus the current drops rapidly near voltage VZ from point 100, when transistor 24 and resistor 28 generate most of current IA, to point 102, when transistor 26 and resistors 30, 34 conduct most of the IA current.

From point 102 to point 104, the current is limited by resistors 30, 34, which have a high resistance. The slope of the curve from about the point 102 to 104 is the equivalent resistance of resistors 30, 34 and transistor 26. The high equivalent resistance causes the current curve to rise quite gradually to point 104. Of course, the actual slopes will vary with the resistance values the designer chooses.

Since the transistors require a voltage of about 0.6 volt to turn on the base-emitter junctions, the current may be limited to leakage currents when VA is below half a volt. Thus the curve may actually not pass through the origin as shown, and the current curve may not be linear near the origin. An idealized curve is shown.

Leakage resistor 36 is used to eliminate leakage current from Zener diode 40 before it breaks down at voltage VZ. The resistance value of leakage resistor 36 is chosen so that the I-R voltage drop across leakage resistor 36 for the expected leakage current through Zener diode 40 is less than 0.6 volt. This keeps the base-emitter junction of transistor 26 from inadvertently turning on due to Zener leakage below breakdown voltage VZ.

Thus the special current limiter uses active components—transistors—to generate large currents at low voltages, but small currents at high voltages. This is the opposite behavior of simple resistor-based current limiters. The special current limiter provides a high current at low voltages to charge the shunt capacitor, but limits current at high voltage to prevent damage to D.C. components. Thus the special current limiter, together with the Zener and capacitor shunts, is ideal for generating an internal D.C. voltage supply.

FIGS. 3A–D are waveforms highlighting operation of the trigger control logic. Trigger control logic 62 of FIG. 1 has two inputs: an IN input from infrared detector 60 and a SYNC input. Trigger control logic 62 generates a trigger output OUT2 that causes re-triggering of triac 20. Trigger control logic 62 also has a ground input and a power (VD) input from the internal power supply (node V2).

Figure 3A:
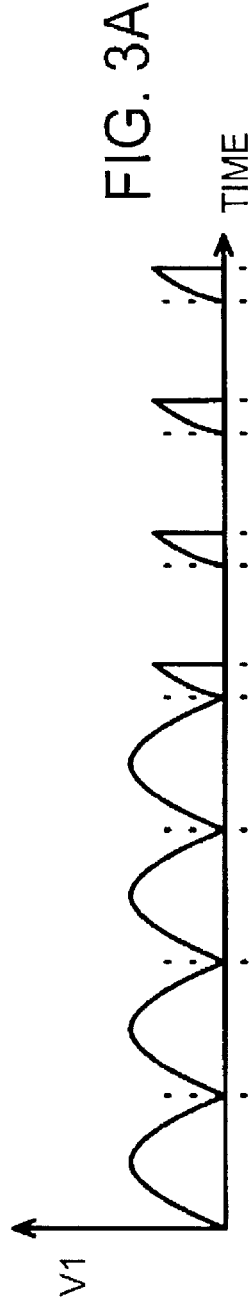
FIGS. 3A–D are waveforms highlighting operation of the trigger control logic.
Figure 3B:
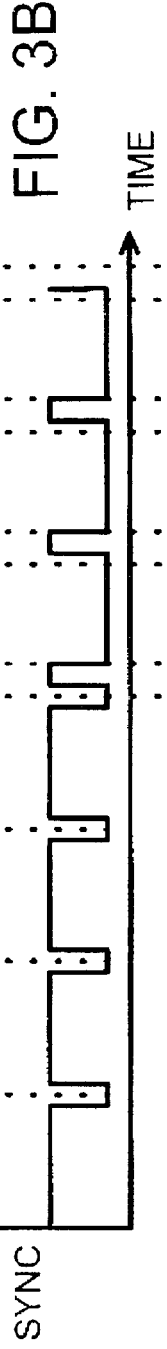

FIG. 3A shows the rectified voltage waveform at node V1, after the diode bridge rectifier but before the special current limiter. A sync signal SYNC is generated by resistor 38 and capacitor 44 that form the synchronous signal sampling network. The rectified waveform on node V1 (FIG. 3A) is filtered to generate the SYNC input of FIG. 3B. A sync signal is generated each time the voltage on node V1 falls back to zero, which occurs twice for each A.C. cycle, at the crossovers. This sync signal is input to the sync input of trigger control logic 62. The actual waveform may be less ideal and more rounded in shape, depending on the actual R and C values chosen for resistor 38 and capacitor 44. The sync signal and waveforms at node V1 falls sharply from high to low level when OUT2 is active.

Figure 3C:
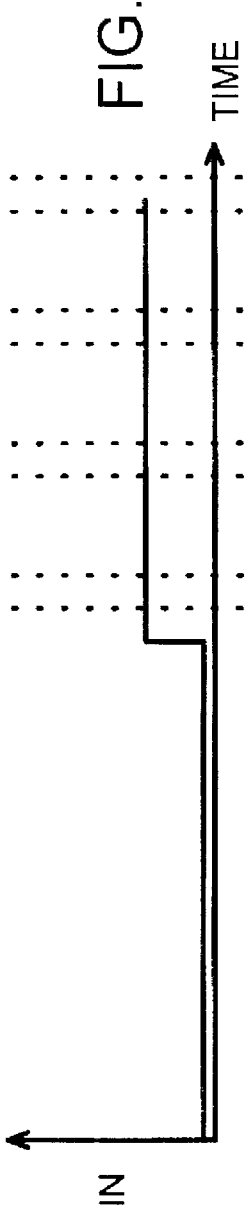

FIG. 3C shows the IN input from the infrared detector. At about the middle of the time period shown in FIG. 3C, a person walks into the detection range or area of infrared detector 60. Infrared detector 60 drives its output high to indicate the detected presence of a person in the area.

Figure 3D:
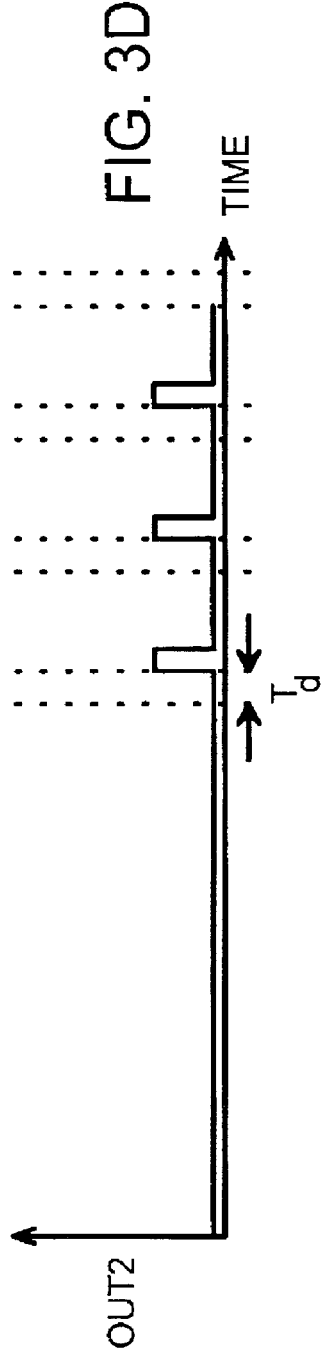

When trigger control logic 62 receives the high IN signal from infrared detector 60, it pulses its output OUT2 as shown in FIG. 3D. These pulses are optically coupled to the power triac's trigger input. Since the pulses occur slightly after the zero-voltage points of the A.C. waveform, the pulses re-trigger and re-enable the triac after the triac turns off at zero A.C. volts. This re-triggering occurs when detection occurs, but not when detection is not signaled by infrared detector 60.

Trigger control logic 62 can be implemented with logic gates. Additional buffers can be added to generate the desired delay Td, or an R-C delay can be added to achieve the desired Td.

Of course, many other alternatives are possible, such as inverting signals at various points. Low-going pulses can be used, such as an active-low rather than an active-high input from the detector. Pulses could be output from the detector at a variety of frequencies rather than a stable level. The level could vary in voltage somewhat, such as due to a less-than-ideal internal D.C. voltage VD.

Thus a re-triggering signal is generated for the triac at a frequency of double the A.C. frequency when detection occurs. No trigger pulses are generated when no detection occurs. These trigger pulses cause the triac to remain on for much of the A.C. cycle, allowing current to flow through the device represented by load resistor 22 of FIG. 1.

Phase Delay Affects A.C. Power Switched

The phase delay Td of the OUT2 re-triggering signal has profound implications for the overall operation of the switch. The phase delay is typically set to between 5° (degrees) and 175°, where 180° is the width of the A.C. pulse in FIG. 3A, or half of the A.C. cycle or period. This phase delay determines the conductive angle of the triac, or the percentage or fraction of the A.C. cycle that triac 20 is turned on. This conductive angle is the amount of time that A.C. current is switched on to the device being switched by the switch circuit. Keeping the conductive angle large and the phase delay Td small maximized the A.C. current and power delivered to the device being switched.

For example, when the phase delay Td is 5°, then the conductive angle is 175°, and the triac remains on for 175/180 of the A.C. cycle. Less power is delivered when the phase delay is increased to 30°, since the conductive angle is reduced to 150°. Then the triac remains on for only 150/180 of the cycle. Power could be reduced further when the phase delay is increased to 120°, since the conductive angle is then cut to 60°, with the triac delivering power only for 60/180, or one-third of the cycle.

The power being delivered can be reduced by increasing the delay Td. A programmable or user-variable delay could be introduced by the trigger control logic. The user could rotate a dial, and the dial position could be translated to a programmable value by any one of a variety of circuits. The programmable value could then be fed to trigger control logic 62, and the delay Td adjusted according to the new programmable value. The new Td then would produce a different conductive angle, and a different power is delivered by the triac. For example, a light could be dimmed by increasing Td in such a manner.

Phase Delay May Affect D.C. Voltage

The phase delay does have a practical lower limit. When the phase delay is too small, the internal D.C. supply voltage at node V2 can drop or become unstable. When the triac is turned on, current is drawn away from the rectifier diode bridge and the special current limiter, maybe preventing the full charging of shunt capacitor 48. The unstable or insufficient internal D.C. voltage VD may then cause infrared detector 60 and trigger control logic 62 to operate improperly. However, phase delays as low as 5° are possible.

FIGS. 4A–B are waveforms showing current and voltage characteristics of the special current limiter. In FIG. 4A, the V1 voltage input to the special current limiter is shown. For 100–240 volt A.C., the peak voltages after the diode bridge, at node V1, are about 155–338 volts. Shunt Zener diode 42 on node V2 has a small breakdown voltage, such as 3 to 5 volts, which is much smaller than the peak voltage on node V1. Thus the current through the special current limiter is determined mostly by its own I-V characteristics.

The I-V curve shown in FIG. 2B is replicated for each peak and mirrored for the quarter-cycles that the voltage V1 is decreasing. Thus FIG. 4B shows many peaks when the voltage V1 is less that the VZ breakdown voltage of Zener diode 40 in the special current limiter. When the voltage V1 in FIG. 4A rises above VZ, current I1 is limited, producing the slightly-sloped regions between current peaks that coincide with the voltage peaks.

The shunt capacitor 48 is charged during the current peaks of FIG. 4B, when the voltage V1 is below VZ. One current peak occurs as V1 is rising from zero, and another current peak occurs as V1 falls back to zero, for a total of two charging-current peaks per half-cycle, or four current peaks for each A.C. cycle.

The maximum voltage V2 on shunt capacitor 48 is limited to 3–5 volts by shunt diode 42. During the remainder of the cycle, when the special current limiter reduces the current, shunt capacitor 48 delivers charge to the infrared detector and trigger control logic's power-supply input (VD). As long as the capacitance value of shunt capacitor 48 is sufficiently large, enough current is delivered during each half-cycle to power the infrared detector and trigger control logic.

Capacitor Charging Stopped When Triac Turns On—FIG. 5

The current waveform of FIG. 4B applies when no person is detected, and triac 20 is off. When detection occurs and triac 20 turns on, the diode rectifier is robbed of current by triac 20, and the voltage on node V1 falls to ground. FIGS. 5A–C are waveforms highlighting charging currents when the triac turns on due to detection.

FIG. 5A is a waveform showing that the rectified voltage V1 is cut off when the triac is turned on. When no person is detected, the triac remains off, and node V1 has the rectified voltage waveform shown by the dotted lines. However, when the triac is enabled by the OUT2 trigger pulses of FIG. 5C from the trigger control logic, the voltage across the diode rectifier bridge falls below the junction turn-on voltage of about 0.7 volt required for diodes 12, 14, 16, 18 to conduct current. Thus the diode bridge turns off when triac 20 turns on. The result is that the rectified voltage on node V1 falls to ground after the trigger pulses on OUT2 turn on the triac for each half-cycle. Voltage V1 pulses high for just a short period at the beginning of each half-cycle.

However, the special current limiter is designed to deliver high current for low voltages. The low voltages on node V1 occur at the beginning of the half-cycle. Thus charging-current peaks still occur before the triac is enabled, as shown in FIG. 5B. For very short phase delays, these current peaks may be cut short, limiting the charging current to shunt capacitor 48. However, a phase delay of as little as 5° should produce a sufficiently large current peak to charge Shunt capacitor 48 with enough charge to supply the detector and trigger control logic for the remainder of the half-cycle. As long as the voltage on node V1 reaches breakdown voltage VZ before the triac turns on, the full charging-current peak is generated. Even without a full charging-current peak, shunt capacitor 48 may be sufficiently charged for proper operation.

Note that FIG. 5B has only one charging-current peak for each half cycle, while FIG. 4B has two charging-current peaks per half-cycle. When detection occurs and the triac turns on, the triac remains on until the A.C. voltage reaches zero. Thus current peak that occurs in FIG. 4B for low voltages as V1 falls does not occur in FIG. 5B because the triac is still on.

The special current limiter produces an initial burst of charge at the beginning of each A.C. half-cycle. This initial current burst quickly charges the shunt capacitor before the triac steals the current from the diode bridge. Thus the internal D.C. supply is powered from the initial part of each half-cycle, corresponding to the phase delay, while the device switched by the triac is powered by the remainder of the half-cycle, corresponding to the conducting angle.

Power Adjustable by Resistors in Special Current Limiter—FIG. 6

The power consumed by the switch circuit is determined to some extent by the special current limiter. The values of resistors 30, 34 determine the current through the special current limiter for high voltages, above VZ. Since the shunt capacitor is sufficiently charged by low voltages, the current delivered during high-voltage periods is basically wasted. Power consumption of the switch can be reduced by using higher resistance values for resistors 30, 34 in the special current limiter.

FIG. 6A is an I-V curve for the special current limiter when larger resistance values are used for the high-voltage resistors. The initial peak 100 provides most of the charging current for the shunt capacitor. Once voltage VZ is reached, current drops to trough 102. Then current is determined primarily by resistors 30, 34. The slope of the I-V curve from trough 102 to point 104 is determined by the resistances of resistors 30, 34.

In FIG. 6B, lower resistance values are used for resistors 30, 34. These lower resistances allow more current to flow through the special current limiter for high voltages. The higher trough 102 and point 104 result from the higher currents. This current is wasted current, since the shunt capacitor was already charged by initial peak 100. Thus the curve in FIG. 6A is better than the curve in FIG. 6B since less current is wasted.

Figure 7:
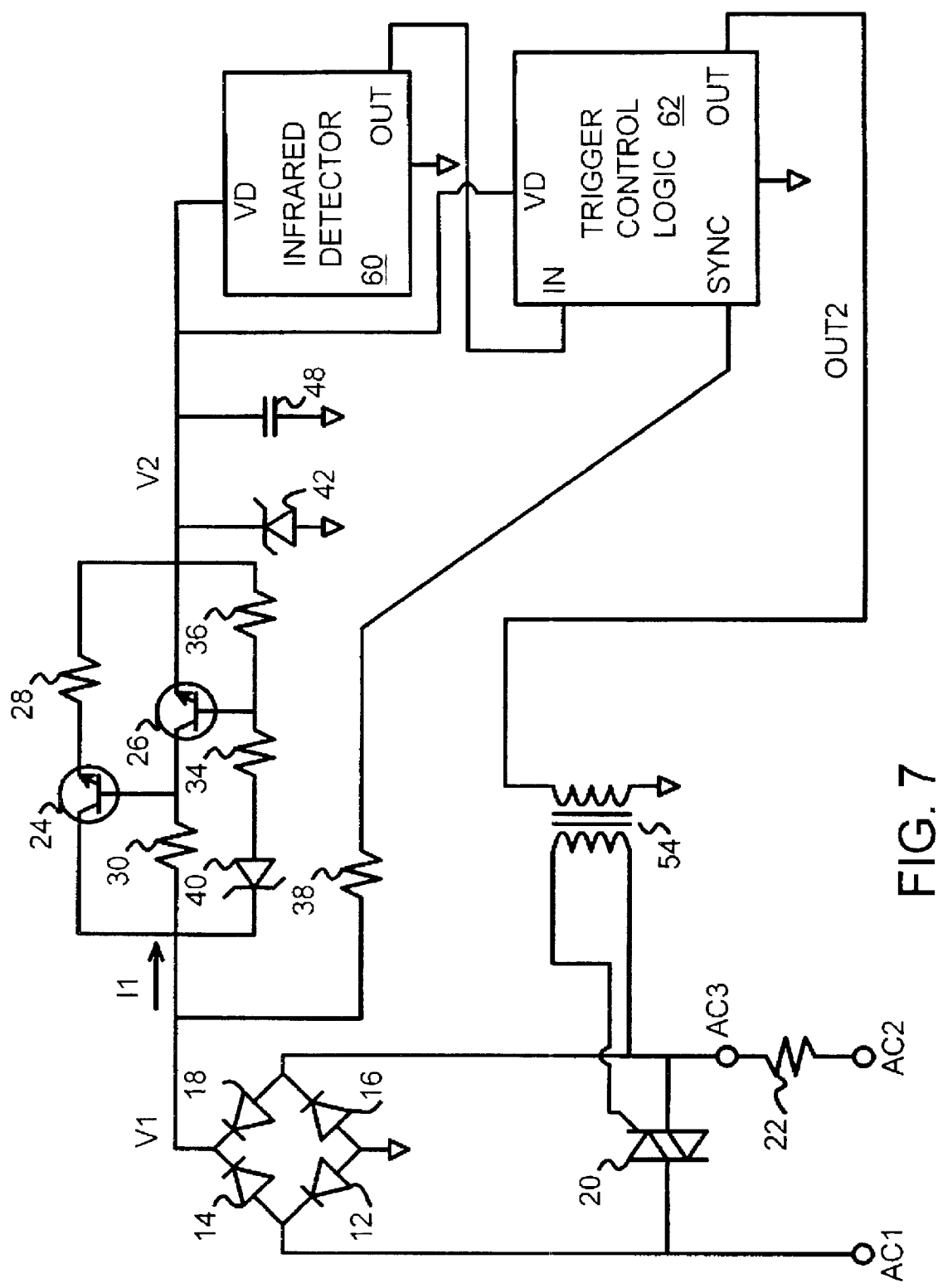
FIG. 7 is an alternate embodiment using a transformer for A.C. isolation.

Transformer Isolation—FIG. 7

FIG. 7 is an alternative embodiment using a transformer for A.C. isolation. The switch circuit in FIG. 7 operates in much the same way as described for the circuit of FIG. 1. Rather than use opto-electronic coupler 50, transformer 54 provides isolation between the A.C. and D.C. sections. Trigger control logic 62 generates a pulse output as described before, and this output OUT2 is applied to one set of windings of transformer 54. The pulse on OUT2 is inductively coupled to the second set of windings of transformer 54, generating a pulse that is applied to the trigger input of triac 20. Limiting resistor 32 is also deleted. Note that limiting resistor 32 could also be deleted from FIG. 1 if a sufficient internal resistance in opto-electronic coupler 50 is provided.

Although transformer 54 does not provide as much isolation as opto-electronic coupler 50, a sufficient amount of isolation is obtained for some applications.

Another alternative shown in FIG. 7 is that capacitor 44 from the synchronous signal sampling network is also deleted. Resistor 38 couples the rectified waveform to the SYNC input of trigger control logic 62. Although the shape of the SYNC waveform is less ideal without capacitor 44, the SYNC waveform may still operate properly, depending on the characteristics of trigger control logic 62. This alternative may also be applied to other embodiments.

Figure 8:
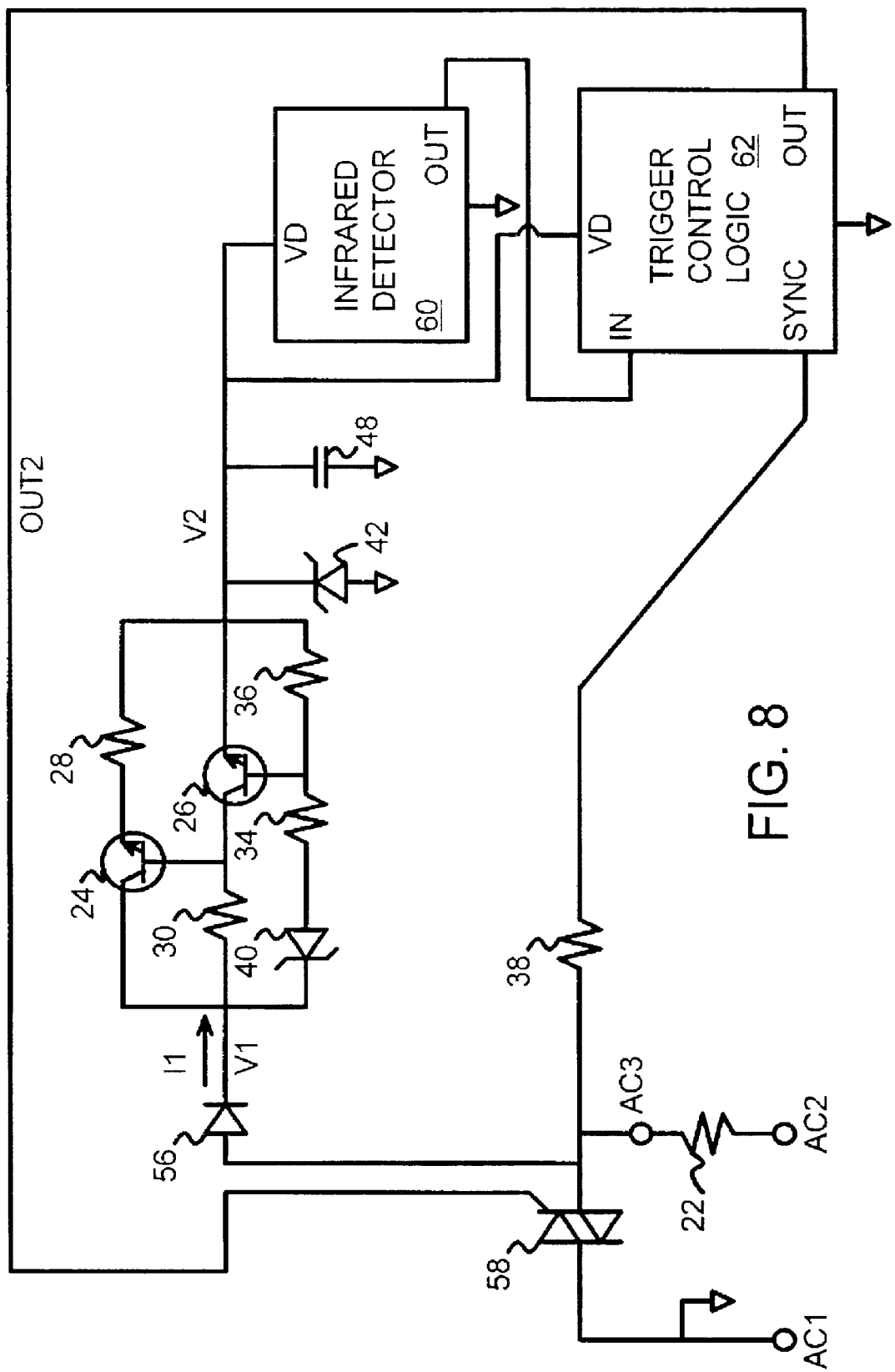
FIG. 8 is still another embodiment using a single diode rectifier.

FIG. 8 is still another embodiment using a single diode rectifier. The four-diode bridge of diodes 12, 14, 16, 18 of FIG. 1 is replaced with single diode 56, which acts as a diode rectifier. Terminal AC1 acts as the D.C. ground. Since only one diode is used, only half-wave rectification is obtained at node V1. This reduces the number of low-voltage charging-current peaks to two per A.C. cycle.

The SYNC input uses resistor 38 without a capacitor as the synchronous signal sampling network. The SYNC signal is generated only once per A.C. cycle since resistor 38 takes its input from AC3 rather than a fully-rectified bridge. To compensate, trigger control logic 62 can trigger on both the rising and falling edges of the SYNC pulse.

The pulsed output OUT2 from trigger control logic 62 is directly coupled to the trigger input of triac 58, with no isolation, a direct-wired connection.

Figure 9:
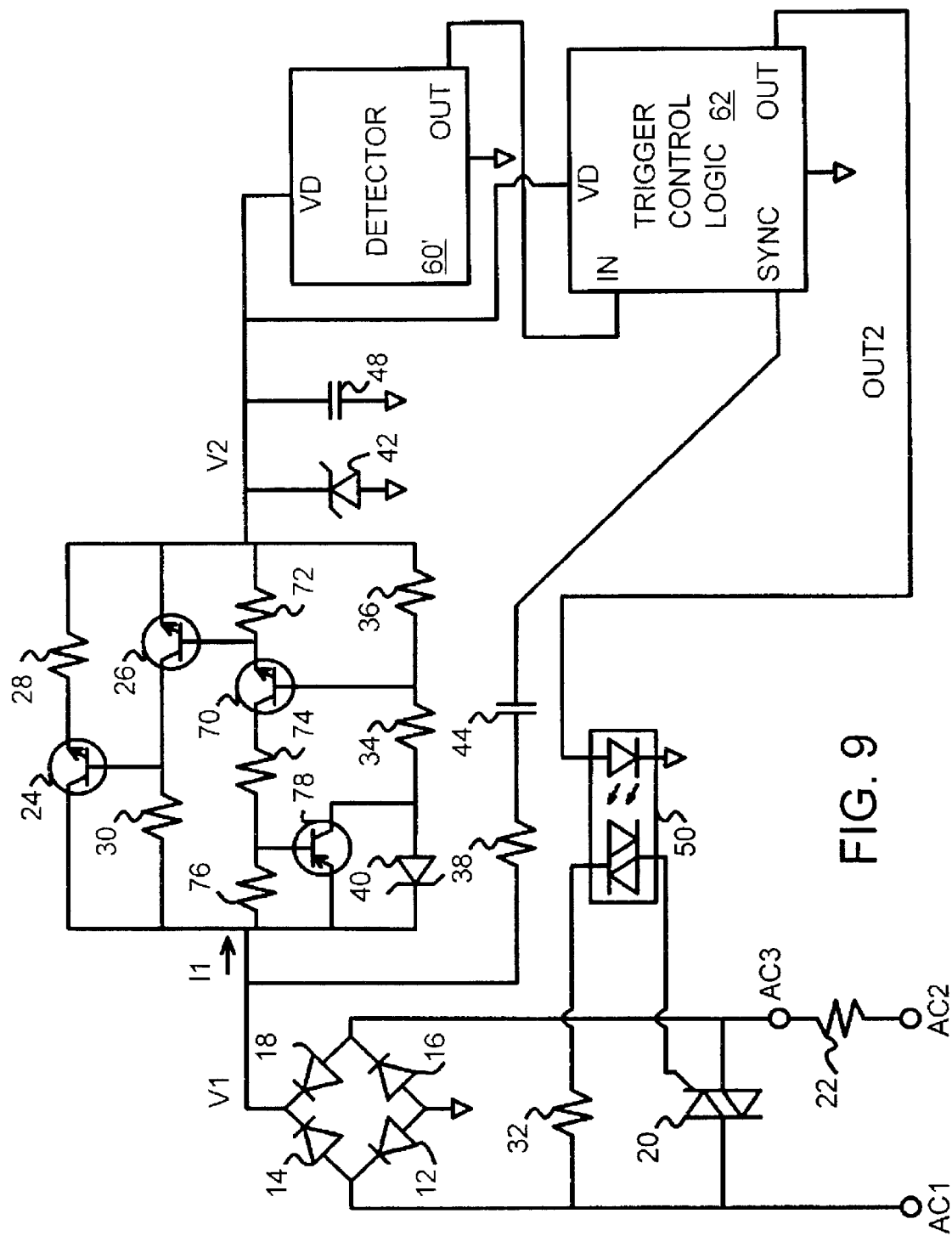
FIG. 9 is an embodiment using a low-power special current limiter.

Low-Power Special Current Limiter—FIG. 9

FIG. 9 is an embodiment using a low-power special current limiter. This embodiment is shown using opto-electronic coupler 50 and a full-wave rectifier bridge of diodes 12, 14, 16, 18, but the alternative transformer or direct coupling could be substituted, as could the single-diode half-wave rectifier.

The special current limiter delivers a larger charging-current peak at low voltages, charging shunt capacitor 48, which then supplies charge during the rest of the A.C. cycle when the special current limiter reduces current at higher voltages. Thus shunt capacitor 48 acts as a D.C. supply to detector 60' and trigger control logic 62. Shunt Zener diode 42 prevents the internal D.C. supply voltage VD from rising too high, preventing damage to detector 60' and trigger control logic 62.

A more complex but lower power special current limiter is shown. It uses two additional transistors 70, 78, which reduce the power consumption when triac 20 is off.

For low voltages below VZ, current flows through transistor 24, which receives a current into its base from resistor 30. Transistor 26 is shut off, since it does not receive any significant base current, as such current is blocked by transistor 70. Transistor 70 is also shut off, since Zener diode 40 has not yet broken down. Only a small leakage current flows through Zener diode 40. This leakage current flows through resistors 34, 36. However, the resistance value of resistor 36 is low enough that an I-R drop of less than 0.6 volt is produced for the leakage current from Zener diode 40. Thus the base-emitter junction of transistor 70 is not turned on by the leakage current. Since transistor 70 is off, transistor 78 is also shut off, since no significant current flows through resistors 76, 74. Thus transistor 78 is deprived of base-emitter current.

Note that in this embodiment transistor 78 is a PNP transistor, with the emitter at node V1, while transistors 70, 24, 26 are NPN transistors. NPN transistors 70, 24, 26 turn on when the base is about 0.6 volt above the emitter junction, when standard bipolar transistors are used. However, PNP transistor 78 turns on when the opposite polarity bias is applied—when the base junction is about 0.6 volt below its emitter. More exotic kinds of transistors can be substituted that have turn-on voltages other than 0.6 volt.

As the voltage on node V1 rises above VZ, and the voltage across Zener diode 40 rises above its breakdown voltage, Zener diode 40 breaks down and begins reverse conduction. A large current flows through Zener diode 40 and resistors 34, 36. Some of this current flows into the base of transistor 70, turning on its base-emitter junction. A collector current begins to flow, from resistors 76, 74, through transistor 70 to resistor 72. While the collector current is normally larger than the base current by a factor of perhaps 100, transistor 70 quickly becomes saturated, limiting the collector current. Other transistors 26, 78 may likewise operate mostly in the saturated region.

As transistor 70 turns on, current flows through resistor 72, creating an I-R voltage drop across it. The base-emitter junction of transistor 26 turns on, and base current flows through transistor 26, turning on its collector current from resistor 30. This collector current robs current from transistor 24, and transistor 24 turns off.

Since resistor 28 is designed to have a lower resistance than the equivalent resistance through resistors 30, 72, 74, 76, 34, 36, the current delivered by the special current limiter drops as V1 rises above VZ. Thus the initial current peak ends as VZ is reached. Also, if detector 60' signals detection, causing trigger control logic 62 to turn on triac 20, bridge diodes 12, 14, 16, 18 then turn off, and voltage V1 falls, ending the current pulse. Of course, triac 20 does not turn on until after the SYNC pulse is received by trigger control logic 62, and after phase delay Td has elapsed. The phase delay is usually designed so that a sufficiently long charging peak has already occurred before triac 20 is turned on.

In the simpler special current limiter of FIG. 1, when detection occurs and voltage V1 drops back to zero, transistor 24 can not turn on again as Zener diode 40 turns off as V1 falls back below VZ. When no detection occurs, a second current peak occurs for each half-cycle V1 pulse as V1 falls back to zero. When transistor 24 turns on again, a larger current again flows. This larger current is undesirable as it consumes power.

In the lower-power special current limiter of FIG. 9, transistors 70, 78 act as a thyristor, being interlocked to each other as back-to-back PNP and NPN transistors. Once transistor 70 turns on, current flowing through resistor 76 develops an I-R voltage drop of at least 0.6 volt across it. Thus the base of transistor 78 is 0.6 volt below its emitter, and the emitter-base junction of this PNP transistor turns on. Current can then flow through the collector of transistor 78.

When voltage V1 drops below VZ, Zener diode 40 turns off. However, transistor 78 is still on, and it conducts current around Zener diode 40, continuing to supply current through resistor 34 into the base of transistor 70. Since transistor 70 remains on, base current still flows through resistor 74 and transistor 78, keeping transistor 78 on. Thus both interlocked transistors 70, 78 remain on, despite Zener diode 40 turning off. Since transistor 70 remains on, transistor 26 also remains on, keeping transistor 24 off.

Keeping transistor 24 off ensures that the large current through low-resistance resistor 28 does not occur, unlike the simpler special current limiter of FIG. 1. Thus the second charging peak is avoided as voltage V1 falls back to ground, either due to detection or due to the end of the V1 half-cycle pulse. Once V1 nears ground, interlocked transistors 70, 78 turn off, and the low power special current limiter is reset for the next half-wave of V1.

With the elimination of the second charging-current peak for falling V1 voltages, power consumption through the low power special current limiter is reduced. Since shunt capacitor 48 is already sufficiently charged by the initial charging peak, shunt Zener diode 42 normally sinks this extra current to ground, saving power compared with the simpler special current limiter of FIG. 1. Thus power consumption is reduced.

Interlocked transistors 70, 78 could be replaced with a triac, silicon-controlled-rectifier (SCR), thyristor, or other kind of triggering device. Some of the resistor may also be replaced.

In this embodiment shown in FIG. 9, detector 60' can be any detector, such as the previously-described infrared detector, or a motion detector, sound detector, vibration detector, pressure, temperature, radio signal, or smoke detector, or other kinds of detectors. Such alternative detectors can be used in the other embodiments as well. Many types of commercially-available detectors may be used. Often additional inputs or outputs are available for these detectors, and some of these additional inputs or outputs may be ignored or connected to fixed voltages or terminated with resistors. Additional interface logic may be needed for some alternative detectors, and trigger control logic 62 can be modified to interface with different signal specifications and timings.

ALTERNATE EMBODIMENTS

Several other embodiments are contemplated by the inventors. For example other special current limiters can be substituted. Other kinds of transistors can be used, such as Darlington transistors, Gallium-Arsenide transistors, or complementary metal-oxide-semiconductor (CMOS) transistors, VMOS transistors, or VDMOS transistors. Some MOS transistors are particularly contemplated, since they can easily be integrated with other components, such as the trigger control logic.

Rather than using the Zener diode to detect voltage VZ, a resistor chain could be used as a voltage divider, producing a test voltage. Once the test voltage rises above a threshold, a trigger could be activated that switched from a high-current-delivering mode to a low-current mode. A mux could be used. A zero-current mode could be used rather than a low-current mode. Many other circuit arrangements and networks can be used, and passive components such as resistors and capacitors can be added or removed from the circuit. Additional triacs or triggered current switches can be used to cut off A.C. current at more than one terminal, or in multiple loops, and for multiple A.C. devices. Rather than switching all of the current to the A.C. device, the current may be reduced by the switch such as for dimming lights. A non-triggered current switch could be used in place of the triac. The trigger pulse could trigger a flip-flop of latch, which then drives a stead signal to control the non-triggered current switch.

The Infrared detector can be replaced by other kinds of detectors, such as motion detectors, microwave detectors, light detectors of other frequencies than infrared, sound, vibration, proximity, or other detectors. The triac could be replaced with a silicon-controlled-rectifier (SCR), thyristor, or other kind of triggering device, and the bridge diodes could themselves be replaced by other kinds of rectifiers. Many types of coupling of the triac trigger can be used, such as other kinds of opto-electronic or optical couplers, inductive couplers such as coils and transformers, capacitive couplers, or even direct coupling.

The conductive angle has been described in an idealized form where the phase delay is 180 minus the conductive angle. Other delays may cause the actual conductive time or angle to decrease from the ideal. For example, the triac, opto-coupler, or device being switched may require time to turn on and off. It is understood that these various parasitic delays are secondary effects and in a first-order analysis the switch operation can be described by ignoring such secondary effects. The breakdown voltage VZ is also somewhat idealized, since the predetermined voltage across the special current limiter also includes voltage drops through resistors and a transistor in series with the Zener diode that is breaking down.

The abstract of the disclosure is provided to comply with the rules requiring an abstract which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words proceeding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line. Low and high voltages may be absolute values of voltages, depending on what is considered to be the ground voltage reference.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electronic switch comprising:

alternating-current (A.C.) terminals for receiving alternating current for powering an A.C. device;

a rectifier, coupled to the A.C. terminals, for generating a rectified D.C. voltage;

a triggered current switch, coupled to at least one of the A.C. terminals, for switching the alternating current to the A.C. device;

a coupler for coupling a trigger pulse to the triggered current switch, the trigger pulse causing the triggered current switch to switch the alternating current;

a current limiter, receiving the rectified D.C. voltage from the rectifier, for generating a charging-current pulse for low voltages of the rectified D.C. voltage, but limiting current at high voltages above the low voltages;

a charge store, receiving the charging-current pulse from the current limiter, for storing charge, the charge store outputting charge to an internal D.C. supply when the current limiter limits current at the high voltages; and D.C. logic, powered by the internal D.C. supply from the charge store, the D.C. logic generating the trigger pulse coupled to the triggered current switch, whereby the D.C. logic is powered by the charge store that is charged by the charging-current pulse for low voltages.

2. The electronic switch of claim 1 wherein the D.C. logic further comprises:

a detector, powered by the internal D.C. supply, for generating a detect signal when the electronic switch is to switch the alternating current to the A.C. device;

trigger control logic, powered by the internal D.C. supply, receiving the detect signal from the detector and generating the trigger pulse.

3. The electronic switch of claim 2 wherein the trigger pulse is synchronized to an A.C. cycle of the alternating current.

4. The electronic switch of claim 3 further comprising:
a synchronizing network, receiving the rectified D.C. voltage, for generating a sync pulse to the trigger control logic, the sync pulse being synchronized to the A.C. cycle of the alternating current;
the trigger control logic receiving the sync pulse from the synchronizing network, the trigger control logic generating the trigger pulse in response to the sync pulse when the detect signal is activated by the detector.

5. The electronic switch of claim 4 wherein the trigger pulse has a phase delay from the sync pulse, the phase delay determining a conducting angle, the conducting angle being a portion of the A.C. cycle wherein the A.C. device is powered, wherein larger phase delays reduce overall power delivered to the A.C. device by reducing the conducting angle.

6. The electronic switch of claim 5 wherein the conducting angle is between 5° and 175°, wherein each A.C. cycle contains two half-cycles having 180° each;
wherein the A.C. terminals receive an alternating voltage of 110 to 240 volts root-mean-square (rms).

7. The electronic switch of claim 5 wherein the phase delay is variable to reducing power to the A.C. device.

8. The electronic switch of claim 5 wherein the detector detects infrared light, sound, motion, proximity, vibration, radio signals, or presence of a person nearby.

9. The electronic switch of claim 5 wherein the current limiter generates the charging-current pulse before the trigger pulse activates the triggered current switch, the charging-current pulse being terminated when the triggered current switch switches the alternating current to the A.C. device;
wherein when the detect signal is not generated by the detector and the triggered current switch is not triggered, the current limiter ends the charging-current pulse in response to the rectified D.C. voltage reaching a predetermined voltage.

10. The electronic switch of claim 9 wherein the current limiter comprises:
a first transistor, conducting a first current when the rectified D.C. voltage is below the predetermined voltage,
a first resistor, limiting the first current from the first transistor;
a second transistor, conducting a second current when the rectified D.C. voltage is above the predetermined voltage,
a second resistor, limiting the second current from the second transistor;
wherein the first resistor has a lower effective resistance than the second resistor, the first current being a larger current than the second current;
wherein the charging-current pulse is generated by the first current through the first transistor, while the second current is limited by the second resistor.

11. The electronic switch of claim 10 wherein the second current is less than a maximum first current at a peak of the charging-current pulse for all rectified D.C. voltages above the predetermined voltage.

12. The electronic switch of claim 11 wherein the current limiter further comprises:
a Zener diode, for conducting current to activate the second transistor when the rectified D.C. voltage is above the predetermined voltage, the Zener diode not conducting sufficient current to activate the second transistor when the rectified D.C. voltage is below the predetermined voltage,
whereby the Zener diode sets the predetermined voltage.

13. The electronic switch of claim 12 wherein the current limiter comprises:
a first path from the rectified D.C. voltage to the charge store, the first path comprising the first transistor and the first resistor in series;
a second path from the rectified D.C. voltage to the charge store, the second path comprising the second transistor and the second resistor in series;
wherein a voltage generated in the second path controls activation of the first transistor;
a third path from the rectified D.C. voltage to the charge store, the third path comprising the Zener diode and at least one resistor in series;
wherein a voltage generated in the third path controls activation of the second transistor.

14. The electronic switch of claim 10 wherein the first and second transistors are bipolar transistors activated by a base current that flows when an activating voltage occurs or metal-oxide-semiconductor (MOS) transistors activated by a gate voltage.

15. The electronic switch of claim 9 wherein when the detect signal is not generated by the detector and the triggered current switch is not triggered, a second charging-current pulse is generated by the current limiter when the rectified D.C. voltage falls back down to the predetermined voltage after having risen above the predetermined voltage,
whereby two charging-current pulses are generated when the detect signal is not generated.

16. The electronic switch of claim 15 wherein the A.C. cycle comprises two half-cycles;
wherein the charging-current pulse is generated at a beginning of each of the two half-cycles for every A.C. cycle,
whereby the charge store is recharged by the charging-current pulse at least twice for every A.C. cycle.

17. The electronic switch of claim 16 wherein the rectifier is a single diode half-wave rectifier or a four-diode full-wave rectifier:
wherein the coupler is an opto-electronic coupler, a capacitor, a transformer, or a direct-wired connection;
wherein the triggered current switch is a triac, a thyristor, or a silicon-controlled rectifier;
wherein the charge store is a shunt capacitor and a shunt diode to a ground;
wherein the synchronizing network is a resistor or a resistor in series with a capacitor.

18. A switch comprising:
terminals for receiving an alternating-current (A.C.) voltage, the A.C. voltage being a power source for the switch;
rectifier means, receiving the A.C. voltage, for generating a direct current (D.C.) voltage, the D.C. voltage varying in cycle pulses synchronized to A.C. cycles of the A.C. voltage, the cycle pulses including an initial region when the D.C. voltage is less than a critical voltage, a middle region wherein the D.C. voltage is above the critical voltage, and a final region wherein the D.C. voltage is again below the critical voltage;
current-switch means, coupled to the terminals, for switching the alternating-current voltage to selectively power an A.C. device in response to a trigger signal;

limiter means, receiving the D.C. voltage from the rectifier means, for generating a high-current peak during the initial region, but for limiting current to below the high-current peak during the middle region;

charge store means, coupled to receive the high-current peak from the limiter means, for storing charge and generating an internal D.C. supply voltage; and D.C. means, powered by the internal D.C. supply voltage from the charge store means, for generating the trigger signal to the current-switch means, the trigger signal causing the current-switch means to power the A.C. device, whereby the internal D.C. supply voltage is generated from the A.C. voltage by charging the charge store means during the initial region of the cycle pulses.

19. The switch of claim 18 wherein the D.C. means is only powered by the charge store means, the switch not receiving any external D.C. power.

20. The switch of claim 18 further comprising:

sync means, coupled to the D.C. voltage from the rectifier means, for generating sync pulses to the D.C. means at a start of every cycle pulse;

the D.C. means comprising detect means for detecting when the A.C. device is to be powered and trigger means, responsive to the detect means, for generating the trigger signal at a start of each cycle pulse when the detect means detects that the A.C. device be powered, the trigger signal being generated after a phase delay relative to the start of every cycle pulse, wherein when the detect means detects that the A.C. device be powered, the A.C. device is powered for a powered portion of every cycle pulse, but not powered for a start portion of every cycle pulse before the powered portion, the start portion being a portion including the phase delay;

whereby the A.C. device is pulsed on for the powered portion of the A.C. cycles but off for the start portions.

21. An alternating-current (A.C.) switch comprising:

A.C. terminals for receiving an A.C. voltage having an A.C. cycle;

a triac, coupled between the A.C. terminals, for connecting the A.C. terminals together to power an A.C. device in response to a trigger input;

a rectifier bridge, coupled across the A.C. terminals, having a ground output and a rectified D.C. node with a rectified voltage;

a special current limiter, coupled to the rectified D.C. node, having a first path that conducts a large peak current to an internal D.C. supply when the rectified voltage is below a critical voltage, and a second path that conducts a small current to the internal D.C. supply when the rectified voltage is above the critical voltage, the small current being less than the large peak current;

a shunt capacitor, coupled across the internal D.C. supply and the ground, for storing charge from the large peak current;

a shunt diode, coupled across the internal D.C. supply and the ground, for limiting a maximum voltage of the internal D.C. supply;

a detector, coupled between the internal D.C. supply and the ground, for generating a detect signal indicating that the A.C. device be powered;

a sync signal, having sync pulses generated in synchronization to the A.C. cycle;

trigger control logic, coupled between the internal D.C. supply and the ground, receiving the detect signal and the sync signal, for generating a first pulse when the detect signal is activated and a sync pulse is received; and a coupler for coupling the first pulse to the trigger input of the triac, whereby the triac is triggered on by the first pulse generated by the trigger control logic powered by the shunt capacitor charged by the special current limiter.

22. The A.C. switch of claim 21 wherein the special current limiter comprises:

the first path comprising a first transistor and a first resistor in series that generate the large peak current;

the second path comprising a second resistor and a second transistor in series that generate the small current and a first control voltage that disables the first transistor when the second transistor is enabled;

a third path comprising at least one resistor and a Zener diode that begins conducting when the critical voltage is reached, the third path generating a second control voltage that causes the second transistor to be enabled when the Zener diode begins conducting.

23. The A.C. switch of claim 22 wherein the special current limiter further comprises:

a first interlocked transistor in series with at least one resistor, for generating a third control voltage, coupled to the second transistor, the third control voltage enabling the second transistor;

a second interlocked transistor, of an opposite polarity type as the first interlocked transistor, coupled to conduct current around the Zener diode when the first interlocked transistor is enabled;

wherein the first interlocked transistor is controlled by the second control voltage, the first interlocked transistor beginning to conduct when the Zener diode conducts as the critical voltage is reached, but the first interlocked transistor continuing to conduct after the Zener diode stops conducting as the rectified voltage falls, whereby the interlocked transistors prevent the first transistor from being re-enabled after the Zener diode turns off.

24. The A.C. switch of claim 23 wherein the sync signal is generated from the rectified voltage by a resistor and a capacitor;

wherein the coupler is an opto-electronic coupler, a capacitor, a transformer, or a direct-wired connection;

wherein the detector detects infrared light, sound, motion, proximity, vibration, radio signals, or presence of a person nearby.

* * * * *